July 28, 1931.  J. K. RUSSELL  1,816,233
LAMP BRACKET
Filed Dec. 19, 1927
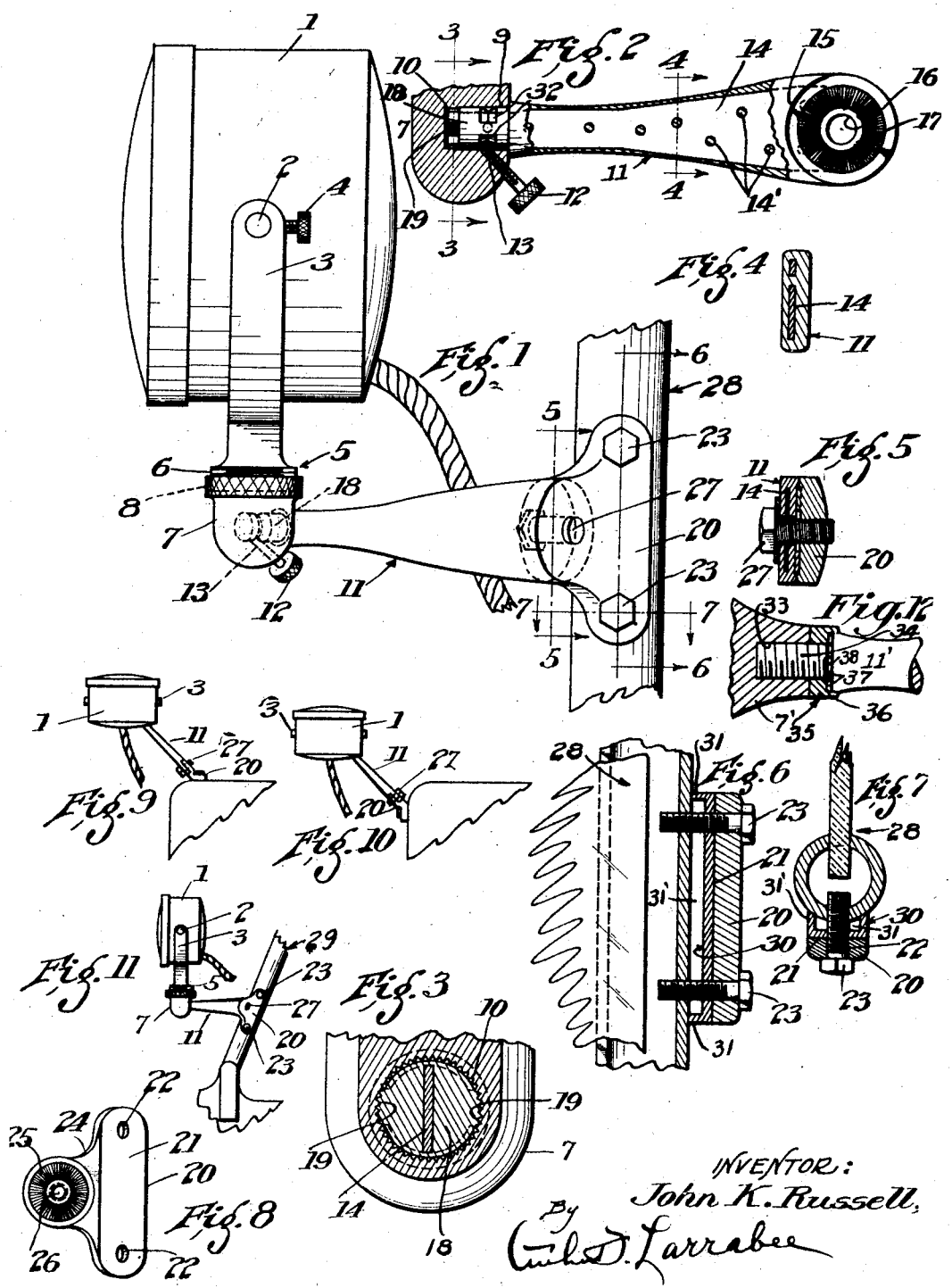
INVENTOR:
John K. Russell,
By Curtis J. Larrabee
HIS ATTORNEY Patented July 28, 1931

1,816,233

UNITED STATES PATENT OFFICE

JOHN K. RUSSELL, OF LOS ANGELES, CALIFORNIA, ASSIGNOR TO NATIONAL ACCESSORIES CORPORATION, OF LOS ANGELES, CALIFORNIA, A CORPORATION OF CALIFORNIA

LAMP BRACKET

Application filed December 19, 1927. Serial No. 241,055.

The device of this invention has been designed particularly for the mounting of lamps of the so-called "spot" variety as commonly carried on automobiles, and which may be swung both horizontally and vertically to project beams of light in any direction forwardly and sidewardly of the automobile to which it is attached, and which requires convenient accessibility from the driver's seat.

For such universal direction of light, the lamp of necessity must be located bodily slightly in advance of the automobile top and for its access, for manipulation by the driver, must be located slightly to one side of the automobile top.

Because of great variations in design and construction of automobile tops, it is the practice to provide lamp supports of special construction for each "condition" of automobile top or body in order to meet the recited exaction of lamp disposition.

The primary object of my invention is to construct a lamp support which by adjustment and adaption of its several parts, and without alteration of either the support or automobile and in combination with an adapter plate, provide the desired and required lamp disposition for any or all of the various conventional designs, characters and constructions of the automobile tops.

Another and more specific object of my invention is to devise a lamp support whose construction involves few and simple parts which may, by relative inversion and pivotal relation, provide substantially universal relation of parts to the end that a spot light may with facility be properly mounted on automobile bodies or tops whose points for lamp support involve different characters of contours and angles.

A feature of the invention is a fixture comprising a base and an angularly disposed arm which may be secured to either a front face or a side face of an automobile body or top and provide in either position a lamp supporting point both forward and to one side of the body or top.

Another feature of my invention is an extension arm having an insert constructed as a stamping of sheet metal around which is formed as by casting or forging, the arm body having integral means for adjustable connection with the recited base fixture and with a fixture for connection with the lamp, whereby such extension arm may possess the required stability, yet involve a minimum of bulk.

Direct advantages incident to the structure of my invention are that a single fixture may be used in connection with practically any or all automobile bodies or tops; simplicity of installation, and cheapness of construction.

Other objects, advantages and features of invention may appear from the accompanying drawings, the subjoined detail description, and the appended claims.

My improvements consist in the novel construction, arrangement and combination of parts as hereinafter fully, clearly and concisely described, definitely pointed out in claims, and illustrated by the accompanying drawings (1 sheet) in which—

Figure 1 shows a spot light and the bracket of my invention as mounted on a vertical element of the wind shield of an open top automobile.

Fig. 2 is a side elevation, partly broken away in section, of the extension arm of my bracket, a fragment of the lamp fixture being shown in section.

Fig. 3 is an enlarged sectional elevation taken on line 3—3 of Fig. 2 showing the means for verticalizing the lamp fixture relative to the extension arm.

Fig. 4 is an enlarged transverse sectional elevation taken on line 4—4 of Fig. 2 showing the reinforcing insert in the extension arm.

Fig. 5 is a transverse sectional elevation taken on line 5—5 of Fig. 1 showing the means for invertibly and angularly adjustably connecting the base fixture and extension arm.

Fig. 6 is a vertical sectional elevation taken on line 6—6 of Fig. 1 showing means for adapting the base fixture to a cylindrical supporting point.

Fig. 7 is a sectional plan view of the adapting means shown in Fig. 6 as taken on line 7—7 of Fig. 1.

Fig. 8 is a perspective view of the base fixture.

Fig. 9 is a diagrammatic plan view showing a spot light as mounted with the base fixture secured to a front face of a closed top of an automobile body.

Fig. 10 is a view similar to Fig. 9 showing the base fixture as secured to a side face of a closed top of an automobile body.

Fig. 11 is a view similar to Fig. 1 showing the base fixture as secured to an upwardly and rearwardly inclined wind shield of an open top automobile.

Fig. 12 is a fragmental view partly in elevation and partly in section showing a modified form of connection between the lamp fixture and extension.

Referring by numerals to the drawings, 1 designates the lamp body, or barrel which may be of any standard design or construction; 2 designates trunnions extending from the lamp body; 3 a yoke forming bearing for the trunnions; 4 means in the form of a set screw providing selective angular adjustment of the lamp barrel relative to the yoke 3, and 5 the threaded yoke stem, all of which are, or may be, of common construction and form no part of my invention except in combination.

By preference. and as shown, the yoke stem 5 is provided with means such as the screw threads 6 for convenient detachable connection with a lamp fixture 7, which is provided with an internally threaded socket 8 to receive the yoke stem and shown only by dotted lines in Fig. 1 and which fixture is provided with a circular bore 9 bearing a right angle relation with the socket 8, and having at its bottom or inner end a continuous rack, or ratchet face 10 of circular form. The fixture 7 by preference is constructed as an integral unit as by forging or casting. For securement to a supporting extension arm such as 11, the lamp fixture 7 carries locking means such as a set screw 12 seated in a threaded seat 13 intersecting the recited bore 9.

The extension arm 11, for lightness in weight and rigidity, composes an insert 14 constructed as a stamping from sheet metal, preferably steel, having a contour such as is shown in Fig. 2 and provided with perforations 14' throughout its length. Formed as by casting about the insert is the arm body proper, 14 preferably of the cross-section in its major width as shown in Fig. 4 and having at its rear ends a lateral reduction 15, provided with a centrally disposed hole 16 about which is formed a substantially circular surface roughened as by radial serrations or teeth 17. At its forward end, the arm is provided with a trunnion 18, for insertion in the bore 9 of the lamp fixture 7 and said trunnion is sectionally reduced in its major circumference as shown in Fig. 2 and 3 to freely fit and revolve in the circular rack 10 of the lamp fixture, and has at diametrically opposite points projecting teeth, or sequential racks or toothed surfaces 19 for intermeshing with the teeth of the rack 10.

The base, or fixture for connection to the automobile top consists, as shown, of a body 20 of oblong shape having a flat face 21 for fitment directly against plane supporting surfaces and is provided with holes 22 at its ends for receiving securing devices such as rivets, bolts, or the screws 23, as shown. Projecting from the body 20 is an arm 24 which stands at an obtuse angle or an angle of approximately 135 degrees to the body, and the outer free end of the arm terminates in a flat face, bearing a circular surface 25 corresponding with the surface 17 of the extension arm 11. Concentrically of the surface 25 is an internally threaded seat 26 to receive a clamping screw 27.

For open top cars the base fixture is usually secured to the windshield as shown at 28 in Fig. 1 and at 29 in Fig. 11, which are ordinarily of circular section and for this purpose I provide a filler plate, or adapter 30 having a flat face forming a bed for the base fixture and having flanges 31' which may be fitted to conform with the windshield frame as best shown in Figs. 6 and 7. The adapter 30 is made of light, strong material and the flanges 31 are easily and quickly filed so as to conform to the surface of the upright to which the light is to be secured. The flanges 31' are preferably beveled as shown in Fig. 7 to also conform to such upright. In this manner, it will be apparent that my device may be easily and quickly attached to practically any of the variety of surfaces with a minimum number of required parts or amount of workmanship. In Fig. 1 the windshield is vertical and with the extension arm 11 substantially alined with the fixture arm.

The extension arm 11 stands substantially horizontal, as required for vertical disposition of the lamp fixture 7.

In Fig. 11 wherein the windshield is inclined upwardly and rearwardly and the base fixture secured in alinement therewith, the arm 11 of the fixture stands at an angle to the horizontal, to the end that the extension arm 11 requires swinging upon the clamp screw 27 to bring the extension arm to such horizontal disposition.

In Fig. 10 with the base fixture secured directly to the upright corner post of the top of a closed car upon a side surface thereof, the same condition and disposition of the lamp exists as in the condition just described in connection with Fig. 1. But when it is desired to secure the base fixture to the upright corner post of the front surface of a closed automobile top as shown in Fig. 9, there is requirement for a complete bodily reversion of the base fixture which obviously requires a complete bodily reversion of the lamp fixture which latter I provide for in the trunnion 18 of the extension arm and circular bore 9 of the lamp bracket. The segmental rack 19 of the extension arm and continuous rack 10 of the lamp fixture provide for the fixing of the lamp fixture against rotation about the trunnion 18 of the extension arm 11.

By preference and as shown, the set screw 12 is disposed at such angle as when rotated to seating position, its inner end will engage in an angular channel or slot 32 and tend to force the trunnion 18 inwardly in the bore of the lamp fixture to prevent disengagement of the two tooth racks. To provide for such end thrust by the screw 12, the trunnion 18 is provided with the segmental channels 32 of V section forming abutments for the end of the set screw 12.

In Fig. 12 I have shown a modified form of securing or mounting the lamp fixture 7' to the extension arm 11'. In this construction I provide a threaded recess 33 in the lamp fixture 7' that is adapted to receive the threaded end 34 of arm 11'. A lock nut 35 threaded on the threaded end 34 is adapted to secure the lamp fixture 7' in adjusted position about the arm 11', and such nut 35 is provided with an annular flange 36 that covers the space 37 which may be left between the shoulders 38 of arm 11' and the lock nut proper.

I claim:

1. A lamp bracket comprising a base fixture having a projecting arm at such an obtuse angle to the base as to extend forwardly of a fixed support for the base and from the same side of the support upon fixing the base to either the side or front of the fixed support; an extension arm; means for securing the extension arm to the base whereby their relative angles may be variably fixed; a lamp supporting fixture; and means for revolubly connecting the lamp fixture to the extension arm.

2. In combination, a base member; an arm extending from said base member and terminating in a flat face; an extension arm having at one end a lateral reduction adapted to fixedly engage the flat face on said base member arm and provided at its other end with a trunnion; and toothed surfaces on said trunnion adapted to intermesh with teeth formed in a lamp fixture.

3. In combination, a base member; an arm extending from said base member and terminating in a flat face; an extension arm having at one end a lateral reduction adapted to fixedly engage the flat face on said base member arm and provided at its other end with a trunnion; toothed surfaces on said trunnion adapted to intermesh with teeth formed in a lamp fixture; and said trunnion being provided with an angular chamber or slot adapted to receive locking means.

4. In combination, a base member; an arm extending from said base member and terminating in a flat face; an extension arm having at one end a lateral reduction adapted to fixedly engage the flat face on said base member arm and provided at its other end with a trunnion; toothed surfaces on said trunnion adapted to intermesh with teeth formed in a lamp fixture; and means adapted to prevent disengagement of the said intermeshing teeth.

5. A lamp bracket comprising in combination, a base fixture having an arm extending at an obtuse angle from said base; an extension arm; means forming a separable pivotal connection between said arms; an axially aligned journal at the free end of the extension arm; and a lamp supporting fixture having a bearing to receive the journal of the extension arm.

In testimony whereof, I have hereunto set my hand at Los Angeles, California, this 28th day of November, 1927.

JOHN K. RUSSELL.